(12) United States Patent
Hooper (10) Patent No.: US 7,508,638 B2
(45) Date of Patent: Mar. 24, 2009

(54) DEVICES, SYSTEMS, AND METHODS FOR PROVIDING ELECTRICAL POWER

(75) Inventor: William P. Hooper, Duluth, GA (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 332 days.

(21) Appl. No.: 11/456,394

(22) Filed: Jul. 10, 2006

(65) Prior Publication Data

US 2007/0201170 A1  Aug. 30, 2007

Related U.S. Application Data

(60) Provisional application No. 60/777,633, filed on Feb. 28, 2006.

(51) Int. Cl.
*H02H 3/00* (2006.01)

(52) U.S. Cl. ........................................... 361/42

(58) Field of Classification Search ............... 361/42
See application file for complete search history.

(56) References Cited

U.S. PATENT DOCUMENTS

| | | |
|---|---|---|
| 5,105,325 A | 4/1992 | Lawrence |
| 5,894,392 A | 4/1999 | McDonald |
| 6,091,591 A | 7/2000 | Heinz et al. |
| 7,138,729 B2 * | 11/2006 | Bailey ........................ 307/45 |
| 2004/0024545 A1 | 2/2004 | Tian |

* cited by examiner

*Primary Examiner*—Stephen W Jackson (57) ABSTRACT

Certain exemplary embodiments comprise an electrical power distribution panel, which can comprise a Source Line Evaluation Detector. The Source Line Evaluation Detector can be configured to open a contactor responsive to at least one condition from a plurality of monitored electrical source line conditions. The Source Line Evaluation Detector can be configured to monitor the one or more monitored electrical source line conditions.

18 Claims, 3 Drawing Sheets

DEVICES, SYSTEMS, AND METHODS FOR PROVIDING ELECTRICAL POWER

CROSS-REFERENCES TO RELATED APPLICATIONS

This application claims priority to, and incorporates by reference herein in its entirety, U.S. Provisional Patent Application Ser. No. 60/777,633, filed 28 Feb. 2006.

BACKGROUND

U.S. Pat. No. 5,894,392 (McDonald), which is incorporated by reference herein in its entirety, allegedly recites a "power distribution unit for supplying temporary branch power has a 240-250 VAC input with input power line conductors L1 and L2, a neutral conductor N, and a ground conductor G. A supervisory circuit checks that the 240-250 VAC input is properly connected to the power distribution unit by requiring that the input voltage exceeds a supervisory circuit threshold voltage substantially greater than 120-125 volts. When that occurs, a contactor is enabled by the supervisory circuit to close first and second contacts therein to pass the 240-250 VAC on lines L1 and L2 therethrough to a 240-250 VAC ground fault interrupter protected circuit breaker outlet. A plurality of 120-125 VAC GFI module outlets are connected across either one of lines L1 and L2 at the output of the supervisory circuit and the neutral conductor N which bypasses the contactor. The supervisory circuit includes a diode bridge circuit connected across power line conductors L1 and L2 to convert a 240-250 VAC input to 240-250 VDC. A voltage threshold zener diode is connected in series with first and second relays across the 240-250 VDC, such that the zener diode ensures that the voltage required to operate the first and second relays is substantially greater than 120-125 VDC. The first relay operates contacts to activate the contactor, and the second relay operates contacts to bypass the neutral conductor N around the contactor." See Abstract.

United States Patent Publication No. 20050122650 (Beasley), which is incorporated by reference herein in its entirety, allegedly recites a "portable electric power supply with a main contactor relay connected in electrical series with a manual safety switch and voltage sensing relay contactor between the neutral conductor and a power conductor of the power supply. A voltage sensing relay detects the voltages in the power supply and turns on the voltage sensing relay contactor when the voltages reach a minimum value. The safety switch is wired in parallel with a latching contactor. The main contactor relay activates a main power contactor and the latching contactor when the voltage sensing relay contactor and one or both of the safety switch and latching contactor are activated, and deactivates the main power contactor and latching contactor when the voltage sensing relay contactor is deactivated. When activated, the main power contactor connects power outlets to the neutral conductor and power conductors." See Abstract.

SUMMARY

Certain exemplary embodiments comprise an electrical power distribution panel, which can comprise a Source Line Evaluation Detector. The Source Line Evaluation Detector can be configured to open a contactor responsive to at least one condition from a plurality of monitored electrical source line conditions. The Source Line Evaluation Detector can be configured to monitor the one or more monitored electrical source line conditions.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DEFINITIONS

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.

activity—an action, act, step, and/or process or portion thereof.

and/or—either in conjunction with or in alternative to.

apparatus—an appliance or device for a particular purpose.

apply—to put to use for a purpose.

approximately—nearly the same as.

associate—to join, connect together, and/or relate.

automatically—acting or operating in a manner essentially independent of external influence or control. For example, an automatic light switch can turn on upon "seeing" a person in its view, without the person manually operating the light switch.

can—is capable of, in at least some embodiments.

cause—to produce an effect.

circuit breaker system—a plurality of electrically coupled components that comprise a device designed to open and close a circuit by non-automatic means and to open the circuit automatically on a predetermined overcurrent. A circuit breaker can be of any type that comprises one or more switches, such as an arc-fault circuit interrupter (AFCI), a ground fault circuit interrupter (GFCI), thermal magnetic, and/or any equivalents thereof, etc. A circuit breaker switch can have a first pole corresponding to an ON position (where current can flow) and a second pole corresponding to an OFF position (where current can not flow). A circuit breaker can comprise one or more actuators. A circuit breaker can have an automatic tripping function wherein an actuator does not necessarily move completely to the OFF position when the corresponding circuit is interrupted.

comprising—including but not limited to.

condition—a state at a particular time.

configure—to make suitable or fit for a specific use or situation.

configured to—capable of performing a particular function.

connect—to join or fasten together.

contactor—an electrical switch configured to open and close one or more poles supplying electrical energy to one or more electrical circuits.

contactor opening circuit—one or more electrically coupled components configured to open an electrical switch, which is electrically coupled to an electrical conductor, to prevent a flow of electrical energy via the electrical conductor.

convert—to transform, adapt, and/or change.

couple—to join, connect, and/or link together.

create—to bring into being.

data—distinct pieces of information, usually formatted in a special or predetermined way and/or organized to express concepts.

data structure—an organization of a collection of data that allows the data to be manipulated effectively and/or a logical relationship among data elements that is designed to support specific data manipulation functions. A data structure can comprise metadata to describe the properties of the data structure. Examples of data structures can include: array, dictionary, graph, hash, heap, linked list, matrix, object, queue, ring, stack, tree, and/or vector.

define—to establish the outline, form, or structure of.

determine—to obtain, calculate, decide, deduce, and/or ascertain.

device—a machine, manufacture, and/or collection thereof.

each—to or from every one of two or more.

earth to ground phase reversal condition—a circumstance wherein an electrically energized electrical source line and an electrical conductor couplable to a grounding circuit are reversed in a wiring process.

electrical—pertaining to electricity.

electrical power distribution panel—a housing adapted to contain electrical components, such as circuit interrupters and/or circuit breakers, which are adapted to manage electrical energy to an electrical device and/or in a circuit.

electrical source line—an electrically conductive metal electrically couplable to an electrical energy source.

electrical source line condition—a monitorable characteristic of an electrical signal carried via a particular conductive path.

electrically couple—to connect in a manner allowing a passage of electrical energy therethrough.

energized phase—a phase of electrical energy characterized by a substantially non-zero root mean squared voltage relative to a ground.

energy—usable power.

exceed—to be greater in magnitude.

form—to create.

gap—an electrical discontinuity, such as a space filled with air and/or a substantially electrically insulating material.

generate—to create, produce, give rise to, and/or bring into existence.

haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

illuminate—to emit light.

information device—any device capable of processing data and/or information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.

input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

install—to connect or set in position and prepare for use.

insufficient voltage condition—a circumstance wherein a monitored electrical potential is below a predetermined threshold.

Light Emitting Diode (LED)—a semiconductor device that lights up when electricity is passed through it.

logical AND circuit—a plurality of electrically coupled components configured to provide an output responsive to all inputs satisfying predetermined criteria.

machine instructions—directions adapted to cause a machine, such as an information device, to perform one or more particular activities, operations, or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software.

machine readable medium—a physical structure from which a machine can obtain data and/or information. Examples include a memory, punch cards, etc.

magnitude—a relative size or extent of.

manage—to direct or control.

may—is allowed and/or permitted to, in at least some embodiments.

measure—to ascertain by a comparison with a standard.

memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

method—a process, procedure, and/or collection of related activities for accomplishing something.

monitor—to check a quality and/or content of an electrical signal.

network—a communicatively coupled plurality of nodes. A network can be and/or utilize any of a wide variety of sub-networks, such as a circuit switched, public-switched, packet switched, data, telephone, telecommunications, video distribution, cable, terrestrial, broadcast, satellite, broadband, corporate, global, national, regional, wide area, backbone, packet-switched TCP/IP, Fast Ethernet, Token Ring, public Internet, private, ATM, multi-domain, and/or multi-zone sub-network, one or more Internet service providers, and/or one or more information devices, such as a switch, router, and/or gateway not directly connected to a local area network, etc.

network interface—any device, system, or subsystem capable of coupling an information device to a network. For example, a network interface can be a telephone, cellular phone, cellular modem, telephone data modem, fax modem, wireless transceiver, Ethernet card, cable modem, digital subscriber line interface, bridge, hub, router, or other similar device.

neutral to ground phase reversal condition—circumstance wherein an electrically energized (i.e., "hot") electrical source line and an electrical conductor couplable to a neutral circuit are reversed in a wiring process.

obtain—to receive, calculate, determine, and/or compute.

open—to electrically decouple in a manner to create a gap across which electrical energy cannot readily flow.

open earth ground condition—a circumstance wherein an electrical grounding circuit comprises a gap across which electrical energy cannot readily flow.

open ground detector—an electrical circuit configured to ascertain an open earth ground condition.

open neutral circuit condition—a circumstance wherein a neutral conductor associated with an electrical circuit comprises a gap across which electrical energy cannot readily flow.

open neutral circuit detector—one or more electrically coupled components configured to ascertain an open neutral circuit condition.

open phase circuit condition—a circumstance wherein an electrically energized conductor of a plurality of conductors comprises a gap across which electrical energy cannot readily flow.

optical detector—a circuit configured to determine a presence of an open electrical circuit and transmit information indicative of the open electrical circuit via an opto-coupler.

opto-coupler—a component capable of optically transferring an electrical signal between two circuits and, at the same time, electrically isolating these circuits from each other.

plurality—the state of being plural and/or more than one.

portable power distribution center—one or more electrically coupled components configured to provide electrical energy to one or more relatively mobile devices and/or systems.

predetermined—established in advance.

presence—a state or fact of current existence.

press-to-test switch—a depressible electrical contactor configured to evaluate a performance of a particular electrical and/or electronic device and/or circuit.

prevent—to keep an event from happening.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

profile—a quantitative description of an object.

provide—to furnish, supply, give, and/or make available.

range—a defined interval characterized by a predetermined maximum value and/or a predetermined minimum value.

receive—to get as a signal, take, acquire, and/or obtain.

recommend—to suggest, praise, commend, and/or endorse.

relative—in comparison with.

render—to make perceptible to a human, for example as data, commands, text, graphics, audio, video, animation, and/or hyperlinks, etc., such as via any visual, audio, and/or haptic means, such as via a display, monitor, electric paper, ocular implant, cochlear implant, speaker, etc.

repeatedly—again and again; repetitively.

request—to express a desire for and/or ask for.

reversal—a condition wherein one or more electrical conductors is electrically coupled to an improper terminal and/or circuit.

select—to make a choice or selection from alternatives.

series—a coupling of components in such a manner that current flows first through one and then through the other.

set—a related plurality.

signal—information, such as machine instructions for activities, encoded as automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal can be synchronous, asynchronous, hard real-time, soft real-time, non-real time, continuously generated, continuously varying, analog, discretely generated, discretely varying, quantized, digital, continuously measured, and/or discretely measured, etc.

simulate—to make in imitation of or as a substitute for.

Source Line Evaluation Detector (SLED)—one or more electrical circuits configured to monitor electrical energy provided to another electrical circuit and open an electrical contactor responsive to a monitored condition.

store—to place, hold, and/or retain data, typically in a memory.

substantially—to a great extent or degree.

system—a collection of mechanisms, devices, data, and/or instructions, the collection designed to perform one or more specific functions.

thereby—by that means.

three pole contactor—an electrical switch electrically coupled to each of three distinct electrical conductors and configured to have a capability of opening an electrical circuit associated with each of the three distinct electrical conductors.

threshold—a point that when exceeded produces a given effect or result.

transmit—to send as a signal, provide, furnish, and/or supply.

triac—an electronic component approximately equivalent to two silicon controlled rectifiers (SCRs/thyristors) joined in inverse-parallel (paralleled but with the polarity reversed) and with their gates connected together.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

via—by way of and/or utilizing.

voltage—an electrical potential.

when—during the time at which.

within—inside.

outside—not within.

DETAILED DESCRIPTION

Certain exemplary embodiments provide an electrical power distribution panel, which can comprise a Source Line Evaluation Detector. The Source Line Evaluation Detector can be configured to open a contactor responsive to at least one condition from a plurality of monitored electrical source line conditions. The Source Line Evaluation Detector can be configured to monitor the one or more monitored electrical source line conditions.

In certain exemplary embodiments, a Source Line Evaluation Detector (SLED) can monitor source input power wiring to portable power distribution centers, and together with a contactor, can provide electrical energy to electrically coupled load circuits responsive to a determination that source input wiring and voltage levels are within one or more predetermined thresholds.

In certain exemplary embodiments, the SLED can be configured to control electrical energy available from a portable power distribution center as a function of correctness of the source input wiring and/or voltage levels. Certain exemplary embodiments can be electrically coupled to portable power distribution centers found at a construction site, sports facility, mobile plant, camp site, recreational facility, trailer home, emergency site, farm, and/or outdoor/indoor venue (such as concerts, political rallies, fairs, community events, and/or sporting events, etc.). Portable power distribution centers (PPDC) can be electrically coupled to temporary power meters and/or generators. Miswired source entry connectors can present potential safety concerns. Safety concerns regarding the correctness of wiring connections have caused certain agencies to provide directives controlling electrical safety. One such agency has been Underwriters Laboratories (UL), which created a standard denoted as UL 1640. The UL 1640 standard provides information regarding wiring connection correctness.

In certain exemplary embodiments, the SLED can combine an ability to determine wiring correctness with voltage range verification in determining whether to provide electrical energy to one or more load circuits. The SLED can provide a positive test for open earth ground and can include a result from the open earth ground test in wire entry tests. The SLED can be configured to control power transmission to one or more electrically coupled load circuits with a contactor such as a three pole contactor. The SLED can provide results of positive tests for one or more of nine potential conditions.

Certain exemplary embodiments comprise a Source Line Evaluation Detector (SLED) controller and a three pole contactor. The SLED controller can monitor correctness of a source main's wiring (Phase A, Phase B, Neutral, and Earth Ground) as well as a magnitude of a voltage from a source of electrical energy. If each input parameter is determined to be within a predetermined range, certain exemplary embodiments can activate the contactor, which, in turn, can complete an electrical circuit to provide electrical energy to one or more load receptacles electrically coupled to a power distribution center. Certain exemplary embodiments can meet or exceed standards comprised in UL 1640, which specifically provides recommendations for Portable Power Distribution Equipment. Certain exemplary embodiments can detect one or more defects in wiring connections coupling an electrical source to the SLED. The one or more defects can comprise:

1) Open Earth Ground;
2) Open Neutral;
3) Open Phase A;
4) Open Phase B;
5) Earth Ground to Phase A reversal;
6) Earth Ground to Phase B reversal;
7) Neutral to Phase A reversal;
8) Neutral to Phase B reversal; and/or
9) Insufficient or excessive source voltage.

If one or more defects are detected, the SLED controller can be configured to open the contactor, which can remove a supply of electrical energy from one or more connected loads. If no defects are detected in source wiring and/or input voltage magnitude, the SLED can be configured to close an electrical circuit configured to provide electrical energy to one or more electrically coupled load circuits and can cause a single Light Emitting Diode (LED) lamp to illuminate.

In certain exemplary embodiments, input wires can be configured to transfer two phases of electrical energy (A and B), one neutral phase, and one earth ground from a power transformer or generator to the power distribution center. Wiring errors can occur at either end of a power cable electrically coupled to the power distribution center.

Certain exemplary embodiments can evaluate correctness of a connection of one or more of a plurality of input wires related to a supply of electrical energy. If the connection is determined to be correct, certain exemplary embodiments can be configured to close a three phase power contactor relay, which can provide electrical energy (such as A, B, and neutral phases) to power distribution center receptacles and output connectors. If one or more wires are determined to be improperly connected (e.g., Phase A and neutral are reversed), certain exemplary embodiments can be configured to open the contactor, thus removing the electrical energy from receptacles and/or output connectors. Certain exemplary embodiments can monitor and verify correctness of an earth ground connection, and can position the contactor responsive to such a determination.

Certain exemplary embodiments can determine if an electrical energy voltage magnitude exceeds an upper predetermined threshold and/or is below a lower predetermined threshold. Certain exemplary embodiments can open the contractor responsive to a determination of an excessive or inadequate electrical energy voltage magnitude. Certain exemplary embodiments can attempt to protect both ground fault protection equipment as well as receptacle load equipment.

Certain exemplary embodiments can comprise an LED lamp, which can indicate a determination of proper wiring connection and/or a determination that a voltage is within a predetermined range.

Figure 1:
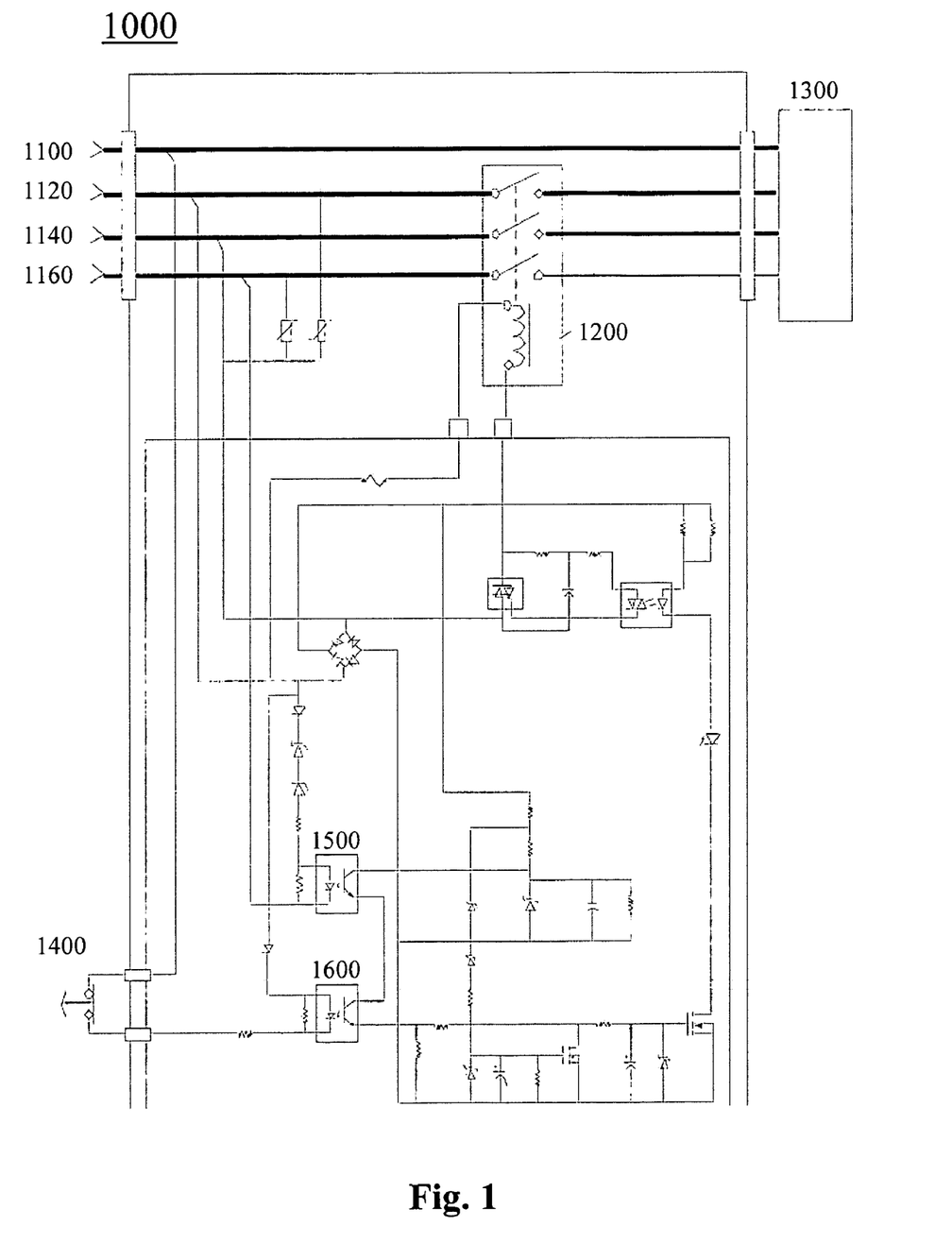
FIG. 1 is an electrical schematic diagram of an exemplary embodiment of a device 1000.

FIG. 1 is an electrical schematic diagram of an exemplary embodiment of a Source Line Evaluation Detector (SLED) 1000, which can comprise a plurality of connections for a plurality of inputs. The plurality of inputs can comprise a ground 1100, a phase A input 1120, a neutral input 1140, and a phase B input 1160.

Each of ground 1100, phase A input 1120, neutral input 1140, and phase B input 1160 can be monitored by SLED 1000. Each of phase A input 1120, neutral input 1140, and phase B input 1160 can be electrically coupled to the line-side of a contactor 1200, which can be a definite purpose three pole contactor. The load-side of the contactor 1200 can be electrically coupled to the power distribution loads, such as a load 1300, which can comprise a circuit breaker system, and/or one or more one and two-phase receptacles, etc.

SLED 1000 can be configured to utilize phase A input 1120 and neutral input 1140 as a power supply source and/or a coil drive voltage for contactor 1200. Such an arrangement can form part of an input wiring detection network, namely, the presence of phase A input 1120 and neutral input 1140. A power supply can be formed via a circuit, as illustrated, comprising a rectifier bridge, resistors, zener diode, bulk filter capacitor, and/or bleed resistor, etc. For example, the power supply can provide electrical energy at a potential in volts of approximately 110, 90.0, 60.1, 45, 38.6, 29.75, 20, 14.7, 11, 9.4, 8.6, 5, 2.3, 0.5, or any value or subrange therebetween. The electrical energy from the power supply can be used as a current source potential for Phase A-B and/or ground optocoupler based detectors. The junction of one or more resistors can be monitored by an overvoltage detector comprising one or more zener diodes, resistors, capacitors, and/or MOSFET transistors, etc. In the event that the potential between phase A input 1120 and neutral input 1140 exceeds a predetermined threshold (e.g., exceeds 150 volts for a 110 volt expected input voltage), a transistor can be turned on, shutting off a triac driver associated with contactor 1200, thus removing power from a coil associated with contactor 1200.

An opto-coupled Phase A-B and Earth Ground detector can comprise two opto-couplers connected in series forming a logical AND circuit. Both Phase A-B and Earth Ground source input wiring can be determined to be correct prior to conditionally enabling the triac driver. Correct wiring can enable a first opto-coupler 1500 and a second opto-coupler 1600 to form a conductive path via an electrically coupled capacitor to contactor 1200.

A first half of an opto coupler based detector can comprise a rectifier, one or more zener diodes, a current limiting resistor, a leakage bypass resistor, and/or first opto coupler 1500. Certain exemplary embodiments can detect a voltage magnitude between phase A input 1120 and phase B input 1160 (e.g., approximately 156 alternating current volts for a 220 volt expected input electrical potential difference between phase A input 1120 and phase B input 1160). In certain exemplary embodiments, if measured alternating current volts between Phase A input 1120 and phase B input 1160 exceed a predetermined threshold, one or more zener diodes can be configured to conduct, which can turn opto coupler 1500 on. The first half of the opto coupler based detector can be configured to detect the presence of the phase current independently from, and isolated from, adjoining phases. Opto coupler 1500 can be configured to detect a current path made available by a correct earth ground connection. The plurality of isolated phase and ground current detectors can be analyzed in a summing circuit, which can electrically couple contactor 1200 to load 1300 and/or illuminate an LED (such as LED 2700 of FIG. 2) if a predetermined subset of ground 1100, phase A input 1120, neutral input 1140, and/or phase B input 1160 are determined to be connected correctly.

A second half of the opto coupler based detector, an open ground detector, can comprise second opto-coupler 1600, a rectifier, a current limiting resistor, and/or a leakage bypass resistor, etc. With phase A input 1120 and ground 1100 correctly coupled to SLED 1000, sufficient current can flow to cause the second opto coupler 1500 to turn on. This can be one half of an optical detector network. Since in certain exemplary embodiments a relatively low earth ground current (such as, for example, in excess of approximately 4 milliamps, which can be determined on a root mean squared basis) can cause a ground fault detector to trip, the SLED earth ground detector current threshold can be an even lower level (e.g., less than approximately 200 microamps on a root mean squared basis in certain exemplary embodiments). Certain exemplary embodiments can comprise a Press To Test (PTT) switch 1400, which can simulate a loss of earth ground and force contactor 1200 to open. In certain exemplary embodiments, PTT switch 1400 can be configured to simulate an open earth ground condition and thereby cause contactor 1200 to open. With PTT switch 1400 depressed, a photo diode current for second opto coupler 1600 can be interrupted, causing a capacitor to discharge below a threshold level of a transistor, which can cause contactor 1200 to shut off.

With both first opto coupler 1500 and second opto coupler 1600 fully on, a charge path for a capacitor can be formed. A plurality of resistors can be comprised by a charge delay network, which can limit a charge time of the capacitor to approximately one second. When the capacitor has charged to a predetermined threshold (such as approximately 3.5 volts), a MOSFET can be turned on. The predetermined threshold electrical potential for the capacitor, in volts, can be 110, 87.3, 75, 41.1, 38.9, 22.2, 16, 9, 8.75, 3.5, 2.7, 0.99, 0.50, or any value or subrange therebetween. If an overvoltage condition exists between phase A input 1120 and neutral input 1140, a transistor can be configured to turn on, which can effectively short out the charge source for the capacitor. With a normal voltage level between phase A input 1120 and neutral input 1140, the capacitor can charge to a gate threshold level of the MOSFET. This conduction can be configured to turn a triac driver and/or a Light Emitting Diode (LED) indicator on. The triac driver can provide sufficient gate current to the triac, which in turn, can energize a coil of contactor 1200. One or more resistors can provide current limiting for the triac driver and/or the LED indicator. The triac can be a snubberless type, which might not require a snubbing network while servicing an inductive load (e.g., a coil of contactor 1200).

Thus, contactor 1200 can be configured to turn on with a controlled delay when ground 1100, phase A input 1120, neutral input 1140, and/or phase B input 1160 are all connected correctly and conduct electrical energy with determined voltage magnitudes within specified voltage limits.

A control circuit of SLED 1000 and contactor 1200 can be directly combined with suitable single and two phase GFCI circuit breaker loads. SLED 1000 can provide personnel and equipment with certain protections against ground fault occurrences and/or certain electrical hazards.

Figure 2:
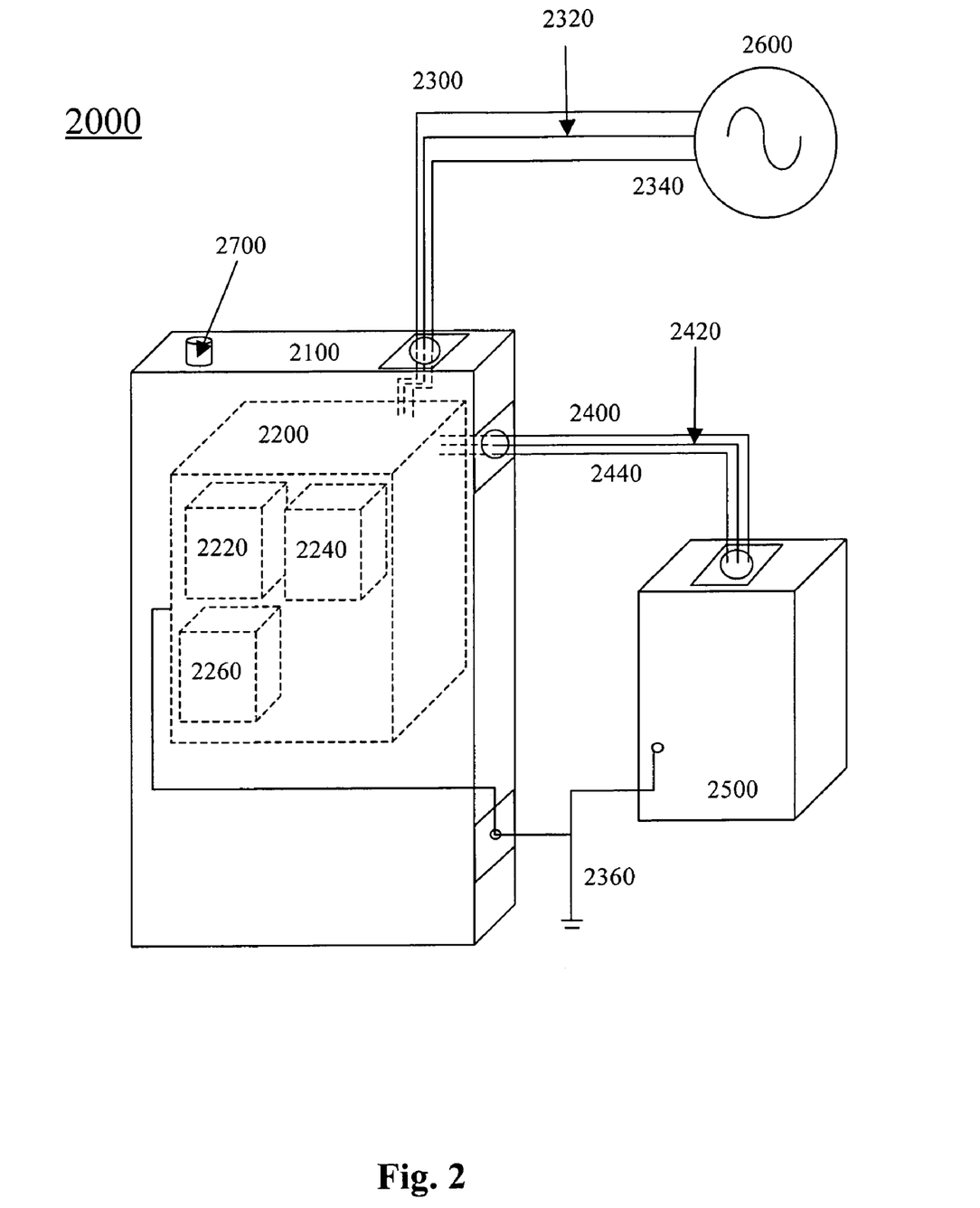
FIG. 2 is a block diagram of an exemplary embodiment of a system 2000.

FIG. 2 is a block diagram of an exemplary embodiment of a system 2000, which can comprise a Source Line Evaluation Detector (SLED) 2200. SLED 2200 can be comprised by an electrical panel 2100, which can be an electrical power distribution panel. In certain exemplary embodiments, electrical panel 2100 can be a portable power distribution center. SLED 2200 can receive electrical energy from an energy source 2600 via a phase A conductor 2300, a phase B conductor 2320, and a neutral conductor 2340. SLED 2200 can be electrically coupled to a ground 2360.

In certain exemplary embodiments, SLED 2200 can comprise a contactor opening circuit 2220 configured to open a contactor, such as a three pole contactor, responsive to at least one condition from a plurality of monitored electrical source line conditions. SLED 2200 can comprise an open earth ground detector 2240, which can be configured to determine a presence of an open earth ground condition. The open earth ground condition can be one of the plurality of monitored electrical source line conditions. SLED 2200 can comprise an open neutral circuit detector 2260, which can be configured to determine a presence of an open neutral circuit condition. The open neutral circuit condition can be one of the plurality of monitored electrical source line conditions SLED 2200 can be electrically coupled to a load 2500. In certain exemplary embodiments, load 2500 can be a circuit breaker system configured to receive electrical energy via electrical panel 2100. Electrical energy can be provided to load 2500 via one or more electrically coupled electrical supply conductors, such as a phase A output 2420, a phase B output 2420, and a neutral output 2440. Load 2500 can be electrically coupled to ground 2360.

SLED 2200 can be configured to open a three pole contactor responsive to one or more monitored electrical source line conditions. SLED 2200 can be configured to monitor the plurality of monitored electrical source line conditions, which can comprise:

1) an open earth ground condition;
2) an open neutral circuit condition;
3) an open phase circuit condition;
4) a determined reversal condition between an energized phase and an earth to ground phase;
5) a determined reversal condition between a neutral phase and an energized phase;
6) an insufficient voltage condition; and/or
7) a measured voltage magnitude that exceeds a predetermined threshold.

In certain exemplary embodiments, SLED 2200 can be electrically coupled to a Light Emitting Diode (LED) 2700, which can be configured to illuminate when each of the plurality of monitored electrical source line conditions are each within a predetermined range and/or comply with predetermined criteria corresponding to a selected condition from the plurality of monitored electrical source line conditions. In certain exemplary embodiments, LED 2700 can be configured to illuminate when a value is within a predetermined range, the predetermined range corresponding to a selected condition from the plurality of monitored electrical source line conditions. In certain exemplary embodiments, LED 2700 can be configured to illuminate when a value is outside a predetermined range, the predetermined range corresponding to a selected condition from the plurality of monitored electrical source line conditions. In certain exemplary embodiments, LED 2700 can be configured to illuminate when each of a plurality of values is outside a predetermined range for the value, the plurality of predetermined ranges associated with the plurality of monitored electrical source line conditions.

Figure 3:
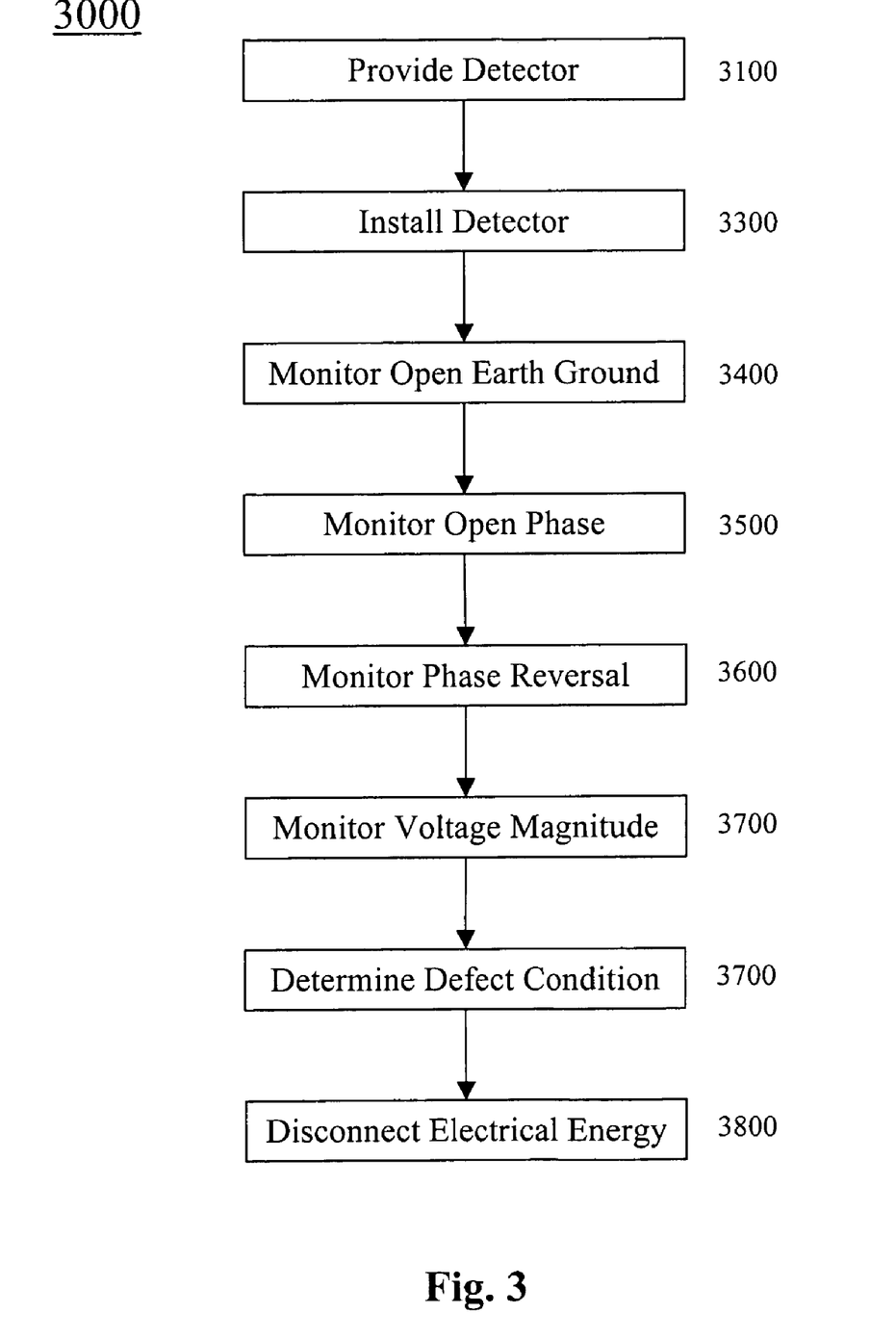
FIG. 3 is a flowchart of an exemplary embodiment of a method 3000.

FIG. 3 is a flowchart of an exemplary embodiment of a method 3000. At activity 3100, a Source Line Evaluation Detector (SLED) can be provided and/or obtained. The SLED can be configured to interact with an electrical power distribution panel. The SLED can be configured to open a contactor, such as a three pole contactor, responsive to at least one monitored electrical source line condition of a plurality of monitored electrical source line conditions. The SLED can be configured to monitor plurality of monitored electrical source line conditions, which can comprise:

1) an open earth ground condition;
2) an open neutral circuit condition;
3) an open phase circuit condition;
4) a determined reversal condition between an energized phase and an earth to ground phase;
5) a determined reversal condition between a neutral phase and an energized phase;
6) an insufficient voltage condition; and/or
7) a measured voltage magnitude that exceeds a predetermined threshold.

For example, the plurality of electrical source line conditions can be monitored via one or more electrical current measurements and/or one or more electrical voltage measurements.

At activity 3300, the SLED can be installed. For example, the SLED can be mounted and/or electrically coupled to an electrical panel.

At activity 3400, the SLED can monitor electrical energy, supplied thereto via a plurality of conductors, for an open earth ground.

At activity 3500, can monitor the supplied electrical energy for an open phase.

At activity 3600, can monitor one or more electrically coupled conductors to determine a phase reversal. The phase reversal can be an energized phase (such as a phase A and/or a phase B) with a ground conductor and/or the energized phase with a neutral conductor.

At activity 3700, can determine a defect condition. The defect condition can comprise at least one of a plurality of determinations failing to meet one or more predetermined criterion, such as one or more measured values determined to be outside of a predetermined range. The plurality of determinations can be selected from the set:

1) Open Earth Ground;
2) Open Neutral;
3) Open Phase A;
4) Open Phase B;
5) Earth Ground to Phase A reversal;
6) Earth Ground to Phase B reversal;
7) Neutral to Phase A reversal;
8) Neutral to Phase B reversal;
9) Insufficient source voltage; and/or
10) Excessive source voltage.

At activity 3800, electrical energy can be disconnected from an electrical load responsive to the determined defect condition.

In certain exemplary embodiments, electrical energy can be provided to a connected electrical load responsive to a determination that each of a plurality of criteria associated with the one or more determinations have been met.

Note

Still other practical and useful embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application.

Thus, regardless of the content of any portion (e.g., title, field, background, summary, abstract, drawing figure, etc.) of this application, unless clearly specified to the contrary, such as via an explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, performed by multiple entities, and/or performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

Accordingly, the descriptions and drawings are to be regarded as illustrative in nature, and not as restrictive.

What is claimed is:

1. A system comprising:
an electrical power distribution panel comprising a Source Line Evaluation Detector, said Source Line Evaluation Detector configured to open a three pole contactor responsive to at least one condition from a plurality of monitored electrical source line conditions, said plurality of monitored electrical source line conditions comprising:
an open earth ground condition, and
an open neutral circuit; and
a press-to-test switch configured to simulate the open earth ground condition.

2. The system of claim 1, further comprising:
said three pole contactor.

3. The system of claim 1, further comprising:
a Light Emitting Diode configured to illuminate when a value is within a predetermined range, said predetermined range corresponding to a selected condition from said plurality of monitored electrical source line conditions.

4. The system of claim 1, further comprising:
a Light Emitting Diode configured to illuminate when a value is outside a predetermined range, said predetermined range corresponding to a selected condition from said plurality of monitored electrical source line conditions.

5. The system of claim 1, further comprising:
a Light Emitting Diode configured to illuminate when each of a plurality of values is within a predetermined range for said value, said plurality of predetermined ranges associated with said plurality of monitored electrical source line conditions.

6. The system of claim 1, further comprising:
a Light Emitting Diode configured to illuminate when each of a plurality of values is outside a predetermined range for said value, said plurality of predetermined ranges associated with said plurality of monitored electrical source line conditions.

7. The system of claim 1, further comprising:
a circuit breaker system configured to receive electrical energy via said electrical power distribution panel.

8. The system of claim 1, further comprising:
one or more electrical supply conductors electrically coupled to said Source Line Evaluation Detector.

9. The system of claim 1, wherein:
said plurality of monitored electrical source line conditions comprises an open phase circuit condition.

10. The system of claim 1, wherein:
said plurality of monitored electrical source line conditions comprises a determined reversal condition between an energized phase and an earth to ground phase.

11. The system of claim 1, wherein:
said plurality of monitored electrical source line conditions comprises a determined reversal condition between a neutral phase and an energized phase.

12. The system of claim 1, wherein:
said plurality of monitored electrical source line conditions comprises an insufficient voltage condition.

13. The system of claim 1, wherein:
said plurality of monitored electrical source line conditions comprises a measured voltage magnitude that exceeds a predetermined threshold.

14. The system of claim 1, wherein:
said Source Line Evaluation Detector comprises an optical detector comprising two opto-couplers coupled in series forming a logical AND circuit.

15. The system of claim 1, wherein:
said Source Line Evaluation Detector comprises an open ground detector that comprises an opto-coupler.

16. The system of claim 1, wherein:
said electrical power distribution panel is a portable power distribution center.

17. A method comprising:
providing a Source Line Evaluation Detector configured to interact with an electrical power distribution panel, said Source Line Evaluation Detector configured to open a three pole contactor responsive to at least one condition from a plurality of monitored electrical source line conditions and a press-to-test switch configured to simulate an open earth ground condition, said plurality of monitored electrical source line conditions comprising:
an open earth ground condition; and
an open neutral circuit condition.

18. A device comprising:
a contactor opening circuit configured to open a three pole contactor responsive to at least one condition from a plurality of monitored electrical source line conditions;
an open earth ground detector configured to determine a presence of an open earth ground condition, said open earth ground condition comprised by said plurality of monitored electrical source line conditions;
an open neutral circuit detector configured to determine a presence of an open neutral circuit condition, said open neutral circuit condition comprised by said plurality of monitored electrical source line conditions; and
a press-to-test switch configured to simulate the open earth ground condition.

* * * * *